(12) United States Patent
Keller et al.

(10) Patent No.: US 8,429,067 B1
(45) Date of Patent: Apr. 23, 2013

(54) SYSTEM AND METHOD FOR DETECTING CHANGES IN BUSINESS STABILITY

(75) Inventors: Kathleen M. Keller, Manchester, NH (US); Sheryl M. York, N. Andover, MA (US)

(73) Assignee: Paymentech, LLC, Dallas, TX (US)

( * ) Notice: Subject to any disclaimer, the term of this patent is extended or adjusted under 35 U.S.C. 154(b) by 4413 days.

(21) Appl. No.: 09/836,953

(22) Filed: Apr. 17, 2001

(51) Int. Cl.
*G06Q 40/00* (2012.01)

(52) U.S. Cl.
USPC ............................................. 705/38; 705/35

(58) Field of Classification Search .................... 705/39, 705/35–38
See application file for complete search history.

(56) References Cited

U.S. PATENT DOCUMENTS

| | | | | |
|---|---|---|---|---|
| 5,210,687 | A |  | 5/1993 | Wolfberg et al. ............. 364/408 |
| 5,797,133 | A |  | 8/1998 | Jones et al. ...................... 705/38 |
| 5,842,185 | A |  | 11/1998 | Chancey et al. ................. 705/40 |
| 5,878,403 | A |  | 3/1999 | DeFrancesco et al. ......... 705/38 |
| 6,016,482 | A |  | 1/2000 | Molinari et al. ................. 705/35 |
| 6,029,149 | A |  | 2/2000 | Dykstra et al. .................. 705/38 |
| 6,058,369 | A |  | 5/2000 | Rothstein ......................... 705/10 |
| 6,064,375 | A | * | 5/2000 | Velez et al. ...................... 705/38 |
| 6,078,891 | A |  | 6/2000 | Riordan et al. ................. 705/10 |
| 6,088,686 | A |  | 7/2000 | Walker et al. ................... 705/38 |
| 6,108,644 | A | * | 8/2000 | Goldschlag et al. ........... 705/69 |
| 6,112,190 | A |  | 8/2000 | Fletcher et al. ................. 705/38 |
| 6,125,349 | A |  | 9/2000 | Maher .............................. 705/1 |
| 6,135,349 | A |  | 10/2000 | Zirkel ........................... 235/375 |
| 6,980,970 | B2 | * | 12/2005 | Krueger et al. ................. 705/39 |
| 7,006,986 | B1 | * | 2/2006 | Sines et al. ................. 705/26.35 |
| 7,103,570 | B1 | * | 9/2006 | Morea et al. .................... 705/38 |
| 7,249,093 | B1 | * | 7/2007 | King ................................ 705/39 |
| 7,263,506 | B2 | * | 8/2007 | Lee et al. ......................... 705/38 |
| 7,356,502 | B1 | * | 4/2008 | LaBadie et al. ................. 705/38 |
| 7,403,922 | B1 | * | 7/2008 | Lewis et al. ..................... 705/38 |
| 7,620,592 | B2 | * | 11/2009 | O'Mara et al. .................. 705/38 |
| 7,720,750 | B2 | * | 5/2010 | Brody et al. .................... 705/38 |
| 8,036,978 | B1 | * | 10/2011 | Saavedra-Lim ................ 705/38 |
| 2002/0026410 | A1 | * | 2/2002 | Woloshin et al. ............... 705/38 |
| 2002/0120559 | A1 | * | 8/2002 | O'Mara et al. .................. 705/38 |
| 2003/0187765 | A1 | * | 10/2003 | Sgaraglio ........................ 705/35 |

OTHER PUBLICATIONS

Price, J E, et al, College Accounting, Seventh Edition, Glencoe Division, McMillan/ McGraw Hill, pp. 816-836.*
Ferranti, M., "Businesses bracing for on-line transactions", Network World Canada. DOwnsview: Mar. 27, 1998.*

* cited by examiner

*Primary Examiner* — Hani M Kazimi
(74) *Attorney, Agent, or Firm* — Jackson Walker L.L.P.; Christopher J. Rourk

(57) ABSTRACT

A system for detecting changes in business stability is provided. The system includes a merchant system that receives periodic payment data from one or more users, such as credit card transaction data. A credit processor coupled to the merchant system receives the periodic payment data from the merchant system and stores the periodic payment data, such as when the credit processor is compiling the credit card transaction data for submission to a credit card company. A merchant credit/risk system coupled to the credit processor generates business stability data from the periodic payment data, such as by determining when changes in the periodic payment data exceed allowable variations for such changes.

20 Claims, 5 Drawing Sheets

SYSTEM AND METHOD FOR DETECTING CHANGES IN BUSINESS STABILITY

FIELD OF THE INVENTION

The present invention pertains to the field of payment data processing. More specifically, the invention relates to a system and method for determining changes in business stability that allows businesses that are undergoing operational problems to be detected from transaction data.

DESCRIPTION OF THE RELATED ART

It is known in the art for merchants to receive electronic payment data in order to provide goods and services without actual physical contact with the customer. For example, telephone orders, online orders via the Internet, or other similar orders can be received by merchants that maintain a store or other similar place of business where customers can also enter and place an order. Likewise, other merchants maintain no such public place of business and only accept orders over the Internet, via phone lines, or through other similar processes. Recent increases in the number of people with access to the Internet have resulted in a significant increase in the number of merchants that do not maintain a public place of business for interfacing with customers.

Merchants without a public place of business can often provide goods and services at a reduced cost, because the need for maintaining a store, a sales staff, and other services that may be associated with providing goods and services to the public can be eliminated. Nevertheless, such merchants can also pose a greater risk to electronic payment processors, lenders, financiers, and other persons or institutions that loan money or otherwise finance the operations of the merchant, because their operations are less visible and are less likely to result in immediate consumer complaints.

For example, credit card transaction processors typically provide provisional credit for credit card transactions for a merchant over a period of time, such that if the merchant files for bankruptcy protection, goes out of business, or is otherwise unable to pay, then the credit card transaction processor will incur a loss. Such credit card transaction processors may receive immediate notice of the fact that a merchant is no longer open for business if a customer is unable to obtain a refund from a public place of business and complains, whereas it may take weeks or months to receive the same complaint for an online business. Likewise, banks, raw materials suppliers, services providers, and other institutions can also incur losses due to the lack of visibility of such merchants.

Thus, while the number of merchants providing goods and services without a public place of business have increased, the ability to monitor such merchants, such as by visiting the merchant's place of business, is not adequate to provide the same level of certainty that is presently obtainable for merchants that also or alternatively deal directly with the public.

SUMMARY OF THE INVENTION

In accordance with the present invention, a system and method for detecting changes in business stability are provided that overcome known problems with detecting business stability.

In particular, a system and method for detecting changes in business stability are provided that allow business stability to be determined from transaction data.

In accordance with an exemplary embodiment of the present invention, a system for detecting changes in business stability is provided. The system includes a merchant system that receives periodic payment data from one or more users, such as credit card transaction data. A credit processor coupled to the merchant system receives the periodic payment data from the merchant system and stores the periodic payment data, such as when the credit processor is compiling the credit card transaction data for submission to a credit card company. A merchant credit/risk system coupled to the credit processor generates business stability data from the periodic payment data, such as by determining when changes in the periodic payment data exceed allowable variations for such changes.

The present invention provides many important technical advantages. One important technical advantage of the present invention is a system and method for detecting changes in business stability that allow transaction data to be monitored to detect changes that indicate possible business instability. The present invention thus facilitates the monitoring of businesses without requiring an operator to visit or inspect the business.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
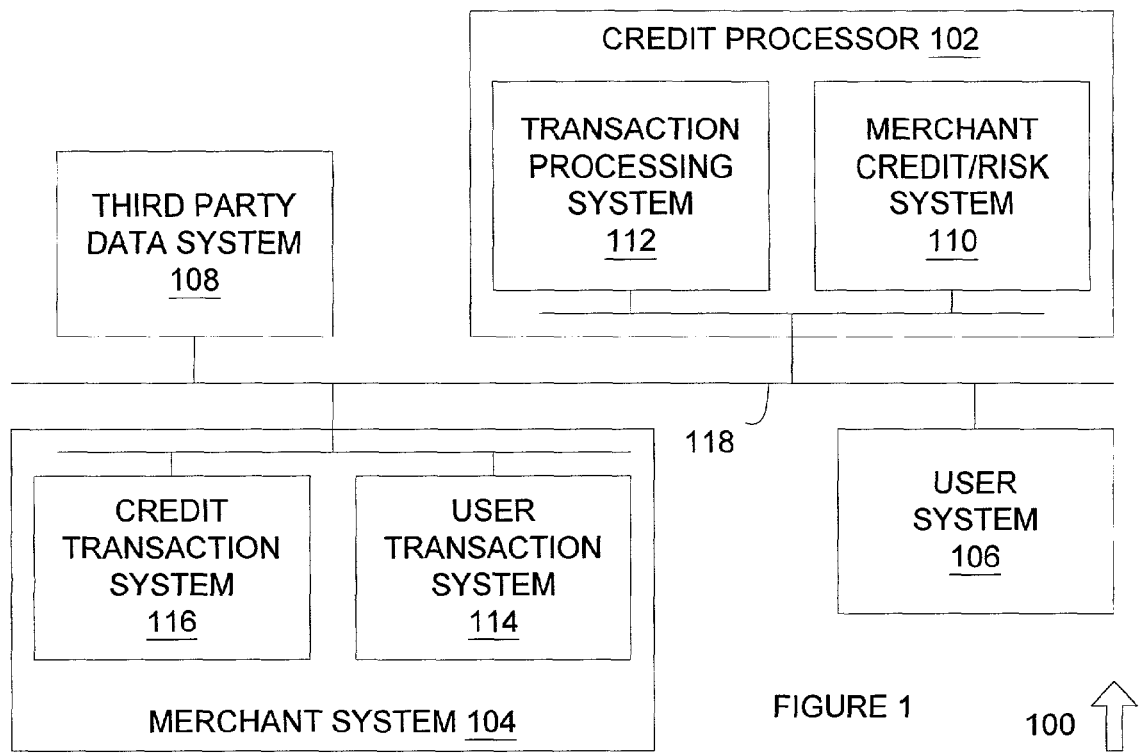
FIG. 1 is a diagram of a system for detecting changes in business stability in accordance with an exemplary embodiment of the present invention.

In the description which follows, like parts are marked throughout the specification and drawings with the same reference numerals, respectively. The drawing figures may not be to scale and certain components can be shown in generalized or schematic form and identified by commercial designations in the interest of clarity and conciseness.

FIG. 1 is a diagram of a system 100 for detecting changes in business stability in accordance with an exemplary embodiment of the present invention. System 100 allows transaction data to be monitored so as to provide an immediate indication of changes in merchant business stability and other useful functionality.

System 100 includes credit processor 102. Credit processor 102 can be implemented in hardware, software, or a suitable combination of hardware and software, and can be one or more software systems operating on one or more general purpose server platforms. As used herein, a software system can include one or more lines of code, objects, agents, threads, subroutines, two or more lines of code or other suitable software structures operating in two or more separate software applications, or other suitable software structures, and can operate on one or more processor platforms, including distributed servers, client server environments, or other suitable software and hardware configurations. In one exemplary embodiment, a software system can include one or more lines of code or other suitable software structures operating in a general purpose software application, such as an operating system, and one or more lines of code operating in a specific purpose software application.

System 100 also includes merchant system 104, which can be implemented in hardware, software, or a suitable combination of hardware and software, which can be one or more software systems operating on a general purpose server platform. Merchant system 104 is coupled to credit processor 102 by communications medium 118, which can be a local area network, a wide area network, the public switched telephone network (PSTN), the Internet, a wireless network, other suitable media, or a suitable combination of such media. As used herein, the term "couple" and its cognate terms, such as "couples" and "coupled", can include a physical connection (such as a copper conductor), a virtual connection (such as one or more randomly assigned memory locations of a data memory device), a logical connection (such as one or more logic gates of a semiconducting device), a wireless connection, other suitable connections, or a suitable combination of such connections. In one exemplary embodiment, systems and components can be coupled to other systems and components through intervening systems and components, such as through an operating system of a general purpose server platform.

System 100 also includes user system 106, which can be implemented in hardware, software, or a suitable combination of hardware and software, which can be one or more software systems operating on a general purpose processor platform. In one exemplary embodiment, user system 106 can include a web browser software application operating on a general purpose processing platform, where the web browser software application receives hypertext markup language (HTML) data or other suitable data that allows a user of user system 106 to view goods and services being offered for sale by merchant system 104, and to place orders with merchant system 104. User system 106 can also receive *.HTML data and generate a request for entry of electronic payment data, such as credit card data, Electronic Data Interchange (EDI) data, or other suitable data.

Merchant system 104 includes credit transaction system 116 and user transaction system 114. User transaction system 114 interacts with user systems 106 to provide *.HTML or other suitable data to present goods or services that are being offered by merchant system 104 to the users of user system 106, and to receive order data from users of user system 106. User transaction system 114 can also request additional data from the users of user system 106, such as shipping address data, user identification data, and payment type data. User transaction system 114 can receive credit transaction data such as a credit card number, an EDI account number, an indication that the user is going to mail in a check or money order, other suitable electronic payment data.

Credit transaction system 116 receives credit payment data from user transaction system 114 and interfaces with credit processor 102 to process the credit data. In one exemplary embodiment, credit transaction system 116 transmits each credit transaction to credit processor 102 as it occurs, such that credit transaction system 116 does not store credit transaction data. In another exemplary embodiment, credit transaction system 116 can store the credit transaction data and transmit the credit transaction data as a single file or other data structure to credit processor 102 on a daily, weekly, or other suitable basis. This data structure can include an EDI data structure or other suitable data structures.

Credit processor 102 includes transaction processing system 112 and merchant credit/risk system 110. Transaction processing system 112 receives the credit transaction data from merchant system 104 and interfaces with one or more other systems to effect payment under the terms of a credit transaction services agreement. In one exemplary embodiment, transaction processing system 112 can interface with one or more credit card companies, such as Visa, MasterCard, or other suitable companies, and can process the credit card charge data in accordance with rules and procedures established by such credit card companies.

In the process of handling such transactions, credit processor 102 assumes temporary liability for such transactions. For example, if merchant system 104 receives money from credit processor 102 but does not provide the goods or services to user system 106, the rules and procedures of the credit card companies or other financial institutions may allow user system 106 to receive a refund from the credit card processor. In such instances, credit processor 102 may be liable for such refunds if funds provided to merchant system 104 cannot be recovered.

Credit processor 102 includes merchant credit/risk system 110, which is used to detect changes in merchant stability from merchant system 104. Merchant credit/risk system 110 can include one or more transaction data monitoring systems that detect changes in merchant stability based upon changes in transaction data, such as purchase data, return data, chargeback data, transaction volume data, transaction amount data, or other suitable data. Likewise, merchant credit/risk system 110 can include an audit system that allows operators of credit processor 102 to perform audits to verify whether a change in merchant stability has occurred if transaction data does not provide a clear indication. Merchant credit/risk system 110 also interfaces with third party data system 108, and can detect changes in merchant stability based upon data provided by a third party data system 108 and request additional data from third party data system 108.

Third party data system 108 includes one or more data sources that provide data on merchant systems 104. In one exemplary embodiment, third party data systems 108 can include credit data from credit rating agencies, news stories from newspapers or business news sources, customer complaint data from third party customer complaint processors, or other suitable sources of data.

In operation, system 100 allows merchant stability changes to be detected from transaction data, and eliminates the need to visit the physical operations of merchant system 104. System 100 allows transaction data, audit data, third party data or other suitable data to be monitored so as to provide credit processor 102 with an indication of whether any changes have occurred in the business stability of merchant system 104. In this manner, credit processor 102 can take immediate steps to mitigate risk posed by continuing to provide services to merchant system 104, such as by requiring additional escrow funds to secure such transactions, additional assurances for merchant system 104, termination of credit processing services from merchant system 104 or other suitable steps.

Figure 2:
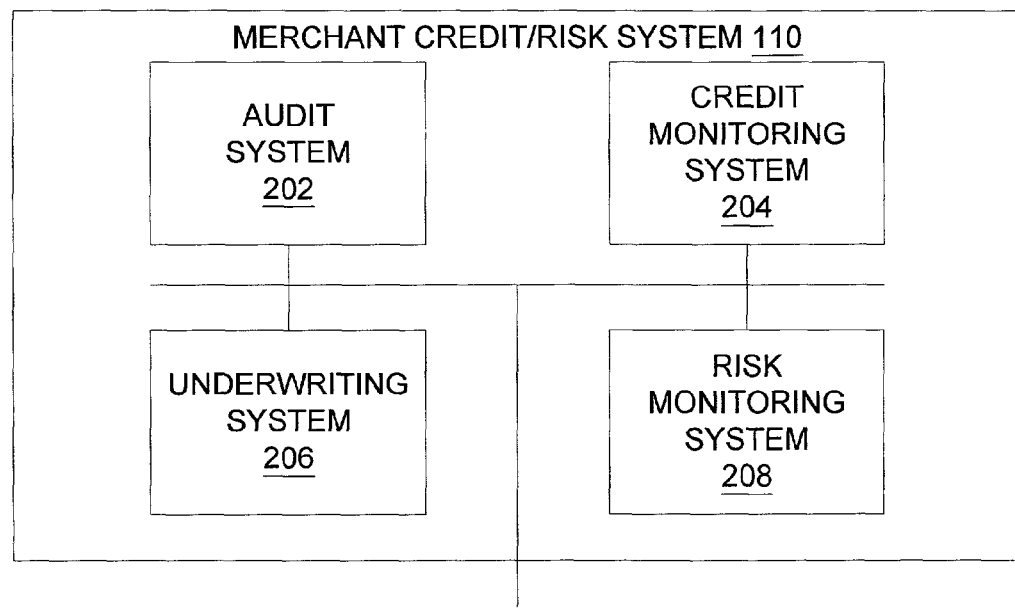
FIG. 2 is a diagram of a system for monitoring merchant credit and risk in accordance with an exemplary embodiment of the present invention.

FIG. 2 is a diagram of a system 200 for monitoring merchant credit and risk in accordance with an exemplary embodiment of the present invention. System 200 includes merchant credit/risk system 110 and audit system 202, credit monitoring system 204, underwriting system 206 and risk monitoring system 208, each of which can be implemented in hardware, software, or a suitable combination of hardware and software, and which can be one or more software systems operating on a general purpose server platform.

Audit system 202 allows a user to perform auditing of merchant system 104, and tracks the results of such audits. Audit system 202 can receive audit initiation data or other flag data from other systems or a user, and can generate an audit notice for use by an operator of audit system 202. The audit notice may also be generated periodically, where the period is based upon the business profile data for a business. Audit system 202 then allows the operator to contact a merchant system 104 to place an order for goods or services. Audit system 202 tracks the progress of the order, such as whether or not the goods or services have been received, the amount of time required for the goods or services to be received, whether the goods or services have been received within the allowed time, and other suitable data.

In addition, audit system 202 can allow a user to cancel an order for goods or services immediately after the order is placed, after confirmation of the order is received, or at other suitable times. Audit system 202 also allows the user to return the ordered items and to enter return data for storage. Audit system 202 stores or receives merchant contact data so that the user can contact an operator of merchant system 104 in the event the goods or services ordered are not what is expected, the user of operator of audit system 202 encounters any problems, or to audit the customer complaints processing of services offered by merchant system 104. Audit system 202 can also interface with a transaction processing system 112 to receive credit transaction data submitted by merchant system 104, and can verify whether the credit transaction data submitted by merchant system 104 correlates to the status of the return or order cancellation entered through audit system 202. Audit system 202 can then generate audit flag data in the event that the merchant system fails to properly request credit data or improperly reflects return data, order cancellation data, charges and credits, or otherwise fails to process a transaction placed through audit system 202 in a proper manner.

Credit monitoring system 204 receives data from merchant systems 104, third party data system 108, and other data sources and monitors the credit of merchant systems 104. In one exemplary embodiment, credit monitoring system 204 allows an operator of credit monitoring system 204 to receive new account data and to set up the account, such as to provide information on the operations of the merchant system 104, the goods or services being sold by merchant system 104, the credit rating of merchant system 104 based upon interactions with third party data system 108, and other suitable information. Credit monitoring system 204 can also receive data from third party data system 108 or other sources and determine whether such data should be flagged for operator review. In one exemplary embodiment, business profile data for merchant system 104 can be used to specify a period of time after which any news sources reporting a story on the merchant system, any credit data updates received, or any other suitable information will be reviewed by an operator. For example, the business profile data can include business type data, where the business type data is used to determine whether the third party data is to be reviewed on a quarterly basis, annual basis, or other suitable basis.

Risk monitoring system 208 receives transaction data and merchant system data and monitors the transaction data to determine whether a change in business stability may be occurring. In one exemplary embodiment, risk monitoring system 208 can store predetermined transaction data variation ranges for merchants based upon the business profile data of the merchant, such as the type of goods sold, the size of transactions, the length of time that the merchant has been in business, or other suitable business profile data. Risk monitoring system 208 then receives transaction data from transaction processing system 112, identifies variations in transaction data between two or more periods, and evaluates the variations to determine whether such variations exceed the predetermined transaction data variation ranges. For example, risk monitoring system can receive transaction size data, refund data, chargeback data, or other suitable data, and can determine whether changes between two or more periods in such data, such as from month to month, indicate that the business stability of a merchant system 104 may have changed.

Underwriting system 206 receives underwriting data for each merchant system 104. In one exemplary embodiment, underwriting system 206 stores escrow data, transaction float data, and other suitable data that indicates the level of exposure of credit processor 102 for each merchant system 104. Underwriting system 206 can also receive data from transaction processing system 112 and can generate underwriting flag data in the event that the level of underwriting for that merchant exceeds predetermined bounds set for that merchant.

In operation, system 200 allows merchant transaction data and third party data to be monitored so as to alert an operator in the event that merchant stability indicators have been exceeded. System 200 allows an operator to audit a merchant, to review credit data, to review transaction data indicative of risk, and to review underwriting data, so as to determine the level of exposure of the credit processor 102. System 200 thus allows credit processors 102 or others to receive data indicative of merchant stability so that appropriate actions can be taken to reduce liability in the event that an operator of merchant system 104 is undergoing business difficulties or is likely to go out of business.

Figure 3:
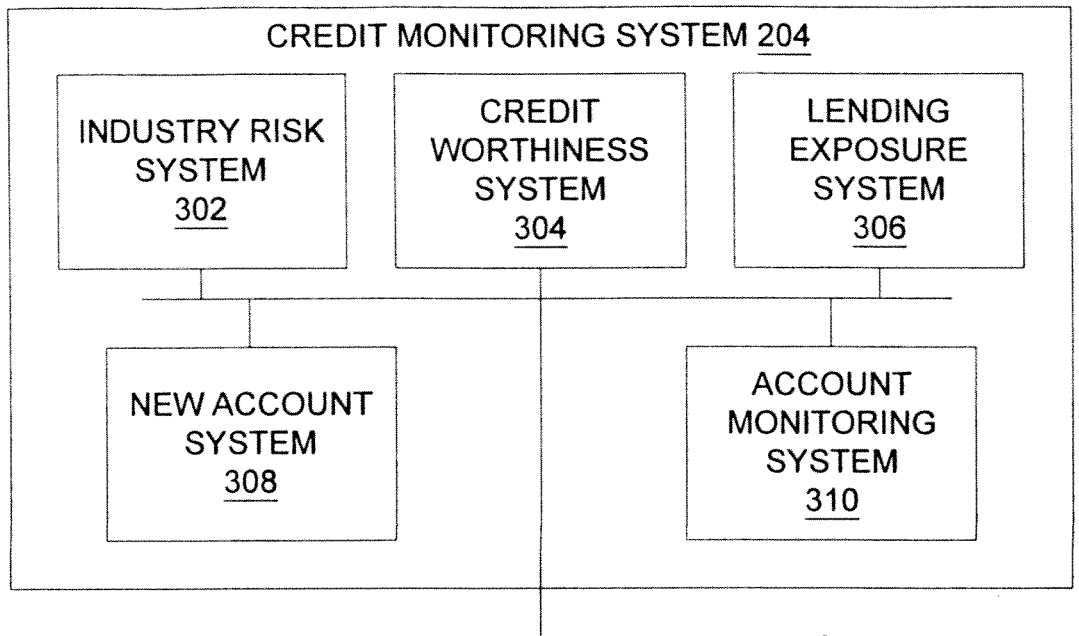
FIG. 3 is a diagram of a system for monitoring credit data in accordance with an exemplary embodiment with the present invention.

FIG. 3 is a diagram of a system 300 for monitoring credit data in accordance with an exemplary embodiment with the present invention. System 300 includes credit monitoring system 204 and industry risk system 302, credit monitoring system 304, lending exposure system 306, new account system 308, and account monitoring system 310, each of which can be implemented in hardware, software, or a suitable combination of hardware and software, and which can be one or more software systems operating on a general purpose server platform.

Industry risk system 302 receives business profile data, such as industry classification data, for each merchant system 104 and correlates the industry classification data with risk rating data for each industry classification. In one exemplary embodiment, certain merchants can be identified as being more risky from a business stability standpoint than others, such as online providers of consumer electronics and small businesses with unskilled management starting up on limited capital to provide goods or services online. Likewise, other merchants can be identified as being less risky than others, such as online outlets for merchants having large national chain store operations. Industry risk system 302 allows merchant systems 104 to be classified, and also receives data from third party data systems 108 bearing on whether the merchant system 104 is performing operations that would change its industry risk classification. In one exemplary embodiment, industry risk system 302 can receive news stories, financial updates, credit rating changes, or other suitable data from third party data systems 108, and can classify such data according to business profile data for merchant system 104. An operator of industry risk system 302 can then periodically review the industry risk data to determine whether the business profile data for a merchant system 104 is correct, whether changes need to be made to the correlation between the industry classification data and risk profile data, or whether other suitable changes need to be performed.

Creditworthiness system 304 receives credit data from third party data systems 108, such as the amount of credit allowed for that merchant system by the third party, the credit liability or amount of money that the merchant system owes to each third party, or other suitable data, and stores the data in a location corresponding to each merchant system 104. Credit worthiness system 304 also includes maximum credit limit data for each merchant system 104, and can receive merchant risk data from industry risk system 302 and can adjust the maximum credit limit data based upon industry risk system 302 data. Creditworthiness system 304 can also generate creditworthiness flag data that indicates that the credit liability of a merchant system 104 has exceeded the maximum credit limit data. For example, the maximum credit limit data can include a ratio of credit availability to credit liability, a maximum level for credit liability based upon the business profile data for the merchant, or other suitable data. The system can notify an operator to perform an audit or take other suitable actions if creditworthiness flag data is generated, such as by interfacing with an audit system.

Lending exposure system 306 determines the level of lending exposure for a merchant system 104 based upon an industry wide lending exposure. In one exemplary embodiment, when a merchant system 104 is set up as a new account, lending exposure system 306 can receive loan data, lease data, employee obligation data, and other exposure data that can be used to estimate whether the merchant system 104 has lending obligations or other exposure that may bear on its ability to remain in operation. Lending exposure system 306 can receive additional data from third party data system 108 and classify it according to merchant system 104, such as new loan information, interest rate change information, or other suitable information that can be used to determine the general exposure of a merchant system 104.

New account system 308 allows an operator to interact with third party data systems 108 and merchant systems 104 to receive industry risk data, credit worthiness data, lending exposure data, business profile data, and other suitable data, so as to set up merchant systems 104 as new accounts. New account system 308 can also allow the operator to specify audit periods, review periods, or other data so as to override settings that may be assigned through correlation to predetermined settings based upon the company's business profile data.

Account monitoring system 310 receives flag data from industry risk system 302, credit worthiness system 304, or lending exposure system 306, or internally generates flag data based upon a periodic review cycle assigned to the merchant system or set according to the merchant system's business profile data, such as a quarterly review, an annual review, or other suitable review cycle. Account monitoring system 310 allows an operator to view the data for a merchant system so as to determine whether the flag data generated by industry risk system 302, credit worthiness system 304, lending exposure system 306, or any periodic review data is indicative of increased risk of business instability for that merchant system 104.

In operation, system 300 provides credit monitoring functionality for merchant systems 104. System 300 allows an operator to receive flag data indicative of problems and to perform additional auditing and review of data from third party data systems 108, merchant systems 104, other suitable data. System 300 can thus be used to ensure that periodic reviews and reviews for cause are not inadvertently disregarded.

Figure 4:
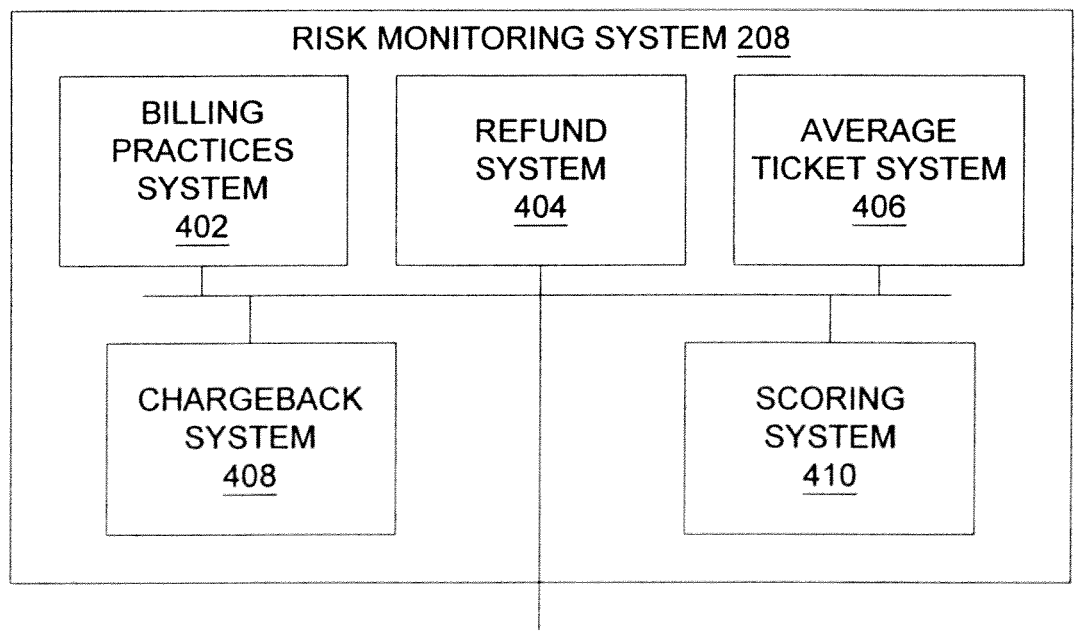
FIG. 4 is a diagram of a system for performing risk monitoring in accordance with an exemplary embodiment of the present invention.

FIG. 4 is a diagram of a system 400 for performing risk monitoring in accordance with an exemplary embodiment of the present invention. System 400 includes risk monitoring system 208 and billing practices system 402, refund system 404, average ticket system 406, chargeback system 408, and scoring system 410, each of which can be implemented in hardware, software, or a suitable combination of hardware and software, and which can be one or more software systems operating on a general purpose server platform.

Billing practices system 402 receives transaction data from transaction processing system 112 and determines whether any change in merchant system 104 billing practices exceeds predetermined billing practices data variation ranges for that merchant. Billing practices system 402 can also interact with industry risk system 302 so as to receive industry risk data for the merchant and to adjust the billing practices data variation ranges based upon the industry risk data. In one exemplary embodiment, billing practices system 402 determines whether the merchant system 104 is providing electronic payment data for the processing of charges within an acceptable period. For example, billing practices system 402 can receive transaction data, posting data, order cancellation data, and other billing data and can determine the whether the amount of elapsed time between such events ("lag time") exceeds a predetermined range, indicates that charges that should have been previously submitted are now being submitted in a later period, or otherwise indicates billing practice irregularities. Billing practices system 402 can also determine trends in such data, so as to determine whether the trend in unacceptable billing practices for a merchant system 104 is becoming worse. Billing practices system 402 can also generate billing practices flag data in the event billing practices data exceeds the billing practices data variation range for the merchant.

Refund system 404 receives transaction data from transaction processing system 112 and determines whether changes in refund processing have occurred that indicate problems with business stability. Refund system 404 can monitor the refund amount data, the refund processing time data, refund quantity data, or other suitable data, and can determine whether changes in such data between two data monitoring periods exceeds a predetermined refund data variation range for the merchant, whether trends in such data indicate developing problems, or whether other conditions exist that indicate the need to further investigate or take corrective action. Refund system 404 can also interact with audit system 202 to determine whether a request for a refund has been processed that has been entered by audit system 202. Refund system 404 can also generate refund flag data in the event that any of the refund data fields exceed allowable ranges, and can provide the refund flag data to audit system 202 or other suitable systems for additional action.

Refund system 404 can also determine whether refund data matches a corresponding sale, so as to detect when an employee may have engaged in fraud. In one exemplary embodiment, refund system 404 can determine whether the type of goods or service sold matches the refund being requested, such as to detect when an employee charged the customer for a more expensive item so as to embezzle the difference, or for a less expensive item, such as to offer a compatriot an illegitimate discount or to share in the refund discrepancy proceeds.

Average ticket system 406 receives transaction data from transaction processing system 112 and determines whether the change in average ticket amount for a merchant system 104 between two successive periods, the trend over two or more periods, or other changes exceed predetermined range data or trend data for the average ticket amount for that merchant. In one exemplary embodiment, if a merchant system 104 is encountering business difficulties, then the merchant system 104 may start to increase the ticket size illegitimately, such that customers or users are being charged for additional goods or services that they did not order. Average ticket system 406 can detect such changes and determine whether the average ticket data exceeds the average ticket range for that merchant. Average ticket system 406 can also generate average ticket flag data in the event such change occurs.

Chargeback system 408 receives transaction data from transaction processing system 112 and determines whether chargeback data being received by credit processor 102 is being processed in a timely manner by merchant system 104. In one exemplary embodiment, a chargeback can be incurred when a user receives a billing statement from a credit card company or other electronic payment provider and disputes a charge. The disputed charge or chargeback is then received through credit processor 102 and is provided to merchant system 104 for processing. Merchant system 104 must then provide data to substantiate the order. A chargeback can be indicative of merchant fraud (such as where the merchant overcharges the customer), third party or employee fraud (such as when a stolen credit card or other stolen payment data is used to make a purchase), or other types of fraud, problems, or errors. If the number of chargebacks increases beyond a predetermined chargeback data variation range for the merchant, such as based upon industry risk system data for that merchant, then chargeback flag data can be generated so as to notify an operator of the need to perform an audit or take other suitable steps. Chargeback system 408 can also interact with audit system 202 to determine whether a chargeback entered through audit system 202 has been processed appropriately.

Scoring system 410 receives data from the merchant system's business profile data, billing practices system 402, refund system 404, average ticket system 406 and chargeback system 408 and determines whether the combination of such data exceeds predetermined indication ranges or scoring ranges, even where the individual data sets do not exceed the data ranges for the corresponding data sets. In one exemplary embodiment, an increase in trend data for some or all sets of data can be indicative of developing problems for certain types of merchants, and may warrant an audit or additional investigation. Scoring system 410 can generate scoring flag data in the event that the scoring data exceeds scoring range data, so as to notify an operator of the need to perform an audit or take other suitable steps. Scoring system 410 can also receive credit card sales data, refund data, chargeback data, refund delay data, shipping delay data, and other suitable data for each merchant from billing practices system 402, refund system 404, average ticket system 406 and chargeback system 408, and can determine the exposure that the operator of system 400 has in terms of the amount of money that the operator would be responsible for if the merchant were to immediately cease operations. In this manner, scoring system 410 can also determine the projected or contingent liability of each merchant to the operator of system 400.

In operation, system 400 allows transaction data to be monitored to determine whether changes in levels of transaction data provide indications of business instability. System 400 allows refund data, return data, chargeback data, billing practices data, or other suitable data to be monitored to determine whether changes between two periods, trends, or other indications require an audit, operator review of the account, or other suitable actions.

Figure 5:
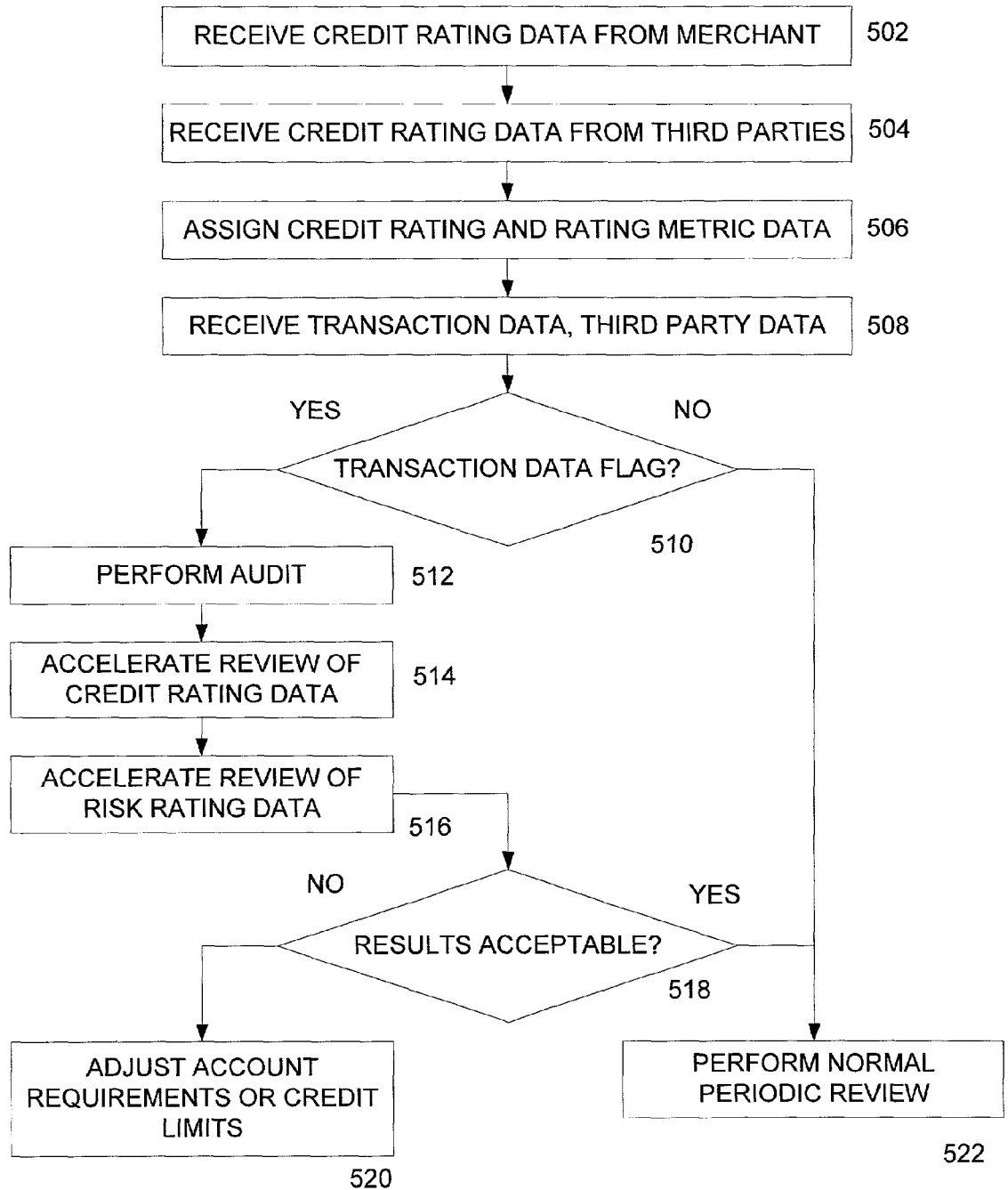
FIG. 5 is a flowchart of a method for monitoring changes in business stability in accordance with an exemplary embodiment of the present invention.

FIG. 5 is a flowchart of a method 500 for monitoring changes in business stability in accordance with an exemplary embodiment of the present invention. Method 500 allows merchant stability changes to be detected so that appropriate actions can be taken to limit risk.

Method 500 begins at 502 where credit rating data is received from the merchant. The credit rating data received from the merchant can include information provided by the merchant on the number of years that the merchant has been in business, the number of years of experience of management personnel, the size of business operations, the projected volume of business, and other data. The method then proceeds to 504.

At 504, credit rating data is received from third parties for the merchant. In one exemplary embodiment, the credit rating data can include rating data from rating agencies, data from banks such as a letter of credit, the amount of credit or money that has been loaned to the merchant by banks and other suitable credit rating data. The method then proceeds to 506.

At 506, credit rating and rating metric data is assigned to the merchant. The credit rating and rating metric data can include allowable ranges for third party credit rating data, third party loan data, transaction data variation ranges that will be used to determine whether a change and risk has occurred for the merchant, and other suitable data. The method then proceeds to 508, where transaction data and third party data is received for the merchant. The transaction data and third party data is then analyzed to determine whether changes in the transaction data or third party data exceed the predetermined ranges, data variation ranges, or other credit rating and rating metric data for the merchant. The method then proceeds to 510.

At 510, it is determined whether a transaction data flag has been generated. If a transaction data flag has been generated, such as a chargeback data flag, a billing practices flag, a refund flag, an average ticket flag, a scoring system flag, or other suitable flags, the method proceeds to 512 where an audit is performed. The audit can include placing an order for goods or services with the merchant and returning the goods or canceling the orders for services and determining whether the merchant processes the order and cancellation appropriately, determining whether the merchant assistance is being provided in a suitable manner and other suitable audit activities. The method then proceeds to 514 where review of credit rating data is accelerated, such as data provided by third parties, data obtained from third parties in response to a request, or other suitable data. The method then proceeds to 516 where the review of risk rating data is accelerated. The risk rating data can include a review of billing practices data, refund data, average ticket data, chargeback data, scoring data or other suitable data. The method then proceeds to 518. Likewise, if it is determined at 510 that a transaction data flag has not been received, the method proceeds directly to 522.

At 518, it is determined whether the results of the audit or other review is acceptable. If it is determined that the results are not acceptable, then the method proceeds to 520 where account requirements or credit limits are adjusted. The merchant can also be required to place additional money in escrow, the amount of credit that will be afforded the merchant can be changed or other suitable procedures or steps can be taken. If it is determined at 518 that the results are acceptable, then the method proceeds to 522 where a normal periodic review is performed, such as on a quarterly, annual, or other basis.

In operation, method 500 allows merchant business stability to be determined for a merchant based upon a review of credit data, third party data, transaction data, and other suitable data. Method 500 allows changes in business stability to be detected early so as to minimize potential losses that may be incurred by loaning money or floating credit to a company that is going out of business.

Figure 6:
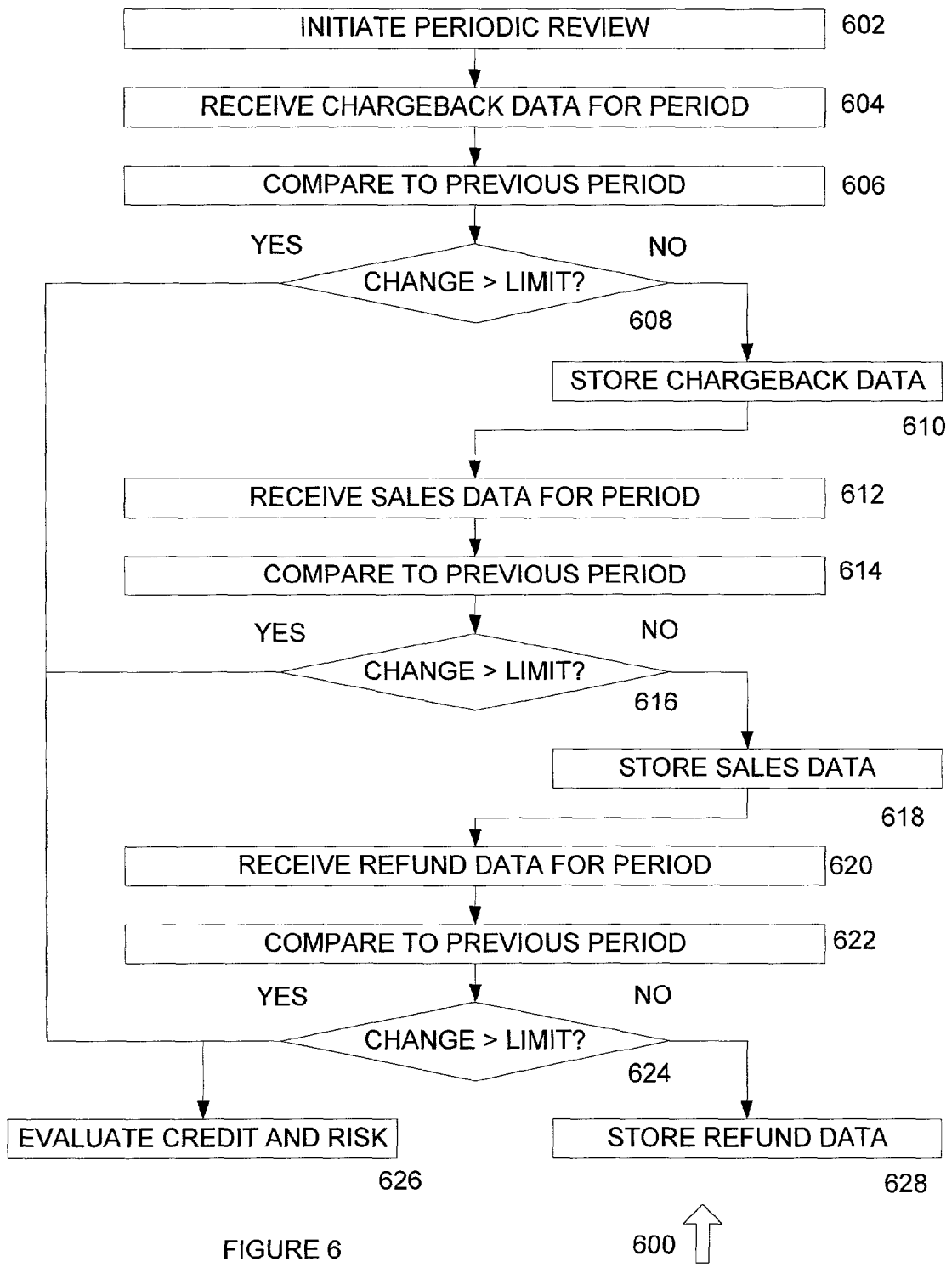
FIG. 6 is a flowchart of a method for detecting changes in business stability in accordance with an exemplary embodiment of the present invention.

FIG. 6 is a flowchart of a method 600 for detecting changes in business stability in accordance with an exemplary embodiment of the present invention. Method 600 is used to determine whether transaction data changes have exceeded allowable ranges for such transaction data changes, so as to detect changes in merchant stability such that appropriate actions can be taken to limit risk.

Method 600 begins at 602 where a periodic review is initiated. Periodic review can be initiated on a daily, weekly, monthly, or other suitable periodic basis. The method then proceeds to 604 where chargeback data is received for that period. The chargeback data can include the number of chargebacks, size of chargebacks, individual or average processing times for chargebacks, or other suitable chargeback data. The method then proceeds to 606. At 606, the chargeback data for the period is compared to one or more previous periods, such as to determine the change between two concurrent periods, a trend occurring over two or more periods, or other suitable data. The method then proceeds to 608.

At 608, it is determined whether the change in the chargeback data exceeds a predetermined chargeback data variation range. For example, the chargeback data variation range can include chargeback data variation ranges for individual refund data categories, combinations of chargeback data variation ranges, or other suitable chargeback data variation ranges. If the change exceeds the predetermined chargeback data variation range, then the method proceeds to 626 where credit and risk rating levels are re-evaluated, an audit is performed, or other suitable actions are taken. Otherwise, the method proceeds to 610 where the chargeback data is stored, such as for subsequent periodic evaluation. The method then proceeds to 612.

At 612, sales data for the period is received. The sales data can include the number of sales, the size of sales in money spent, the length of time between when the sale is made and when it is reported, and other suitable data. The method then proceeds to 614. At 614, sales data for the present period is compared to the sales data for one or more previous periods, such as to determine changes between two concurrent periods, trend data, or other suitable data. The method then proceeds 616.

At 616 it is determined whether any changes in the sales data or sales data trends exceed predetermined sales data variation range. For example, the sales data variation range can include sales data variation ranges for individual sales data categories, combinations of sales data variation ranges, or other suitable sales data variation ranges. If it is determined that 616 that the sales data changes exceed the sales data variation ranges then the method proceeds to 626 where credit and risk ratings are re-evaluated, an audit is performed, or other suitable actions are taken. Otherwise, the method proceeds to 618 where the sales data is stored, such as for evaluation at subsequent periods. The method then proceeds to 620.

At 620, refund data from the period is received. Refund data can include the number of refund requests, the size of refund request, the length of time required to process the refund request, or other suitable data. The method then proceeds to 622, where the refund data for the period is compared to refund data for one or more previous periods, such as determined changes between refund data for two concurrent periods, trend data, or other suitable data. The method then proceeds to 624.

At 624 it is determined whether the change in refund data exceeds predetermined refund data variation ranges. For example, the refund data variation range can include refund data variation ranges for individual refund data categories, combinations of refund data variation ranges, or other suitable refund data variation ranges. If it is determined at 624 that the changes are greater than predetermined refund data variation range limits, the method proceeds to 626 where credit and risk ratings are evaluated, an audit is performed, or other suitable actions are taken. Otherwise the method proceeds to 628 where the refund data is stored, such as for further evaluation at a subsequent period.

In operation, the method 600 is used to detect changes in business stability based upon transaction data. Method 600 allows chargeback data, sales data, refund data, or other suitable data to be monitored to determine whether or not changes in business stability may have occurred. If changes in stability are detected, flags are generated so that appropriate actions can be taken, such as an audit, re-evaluation of allowable ranges for credit limits, or other store options.

Figure 7:
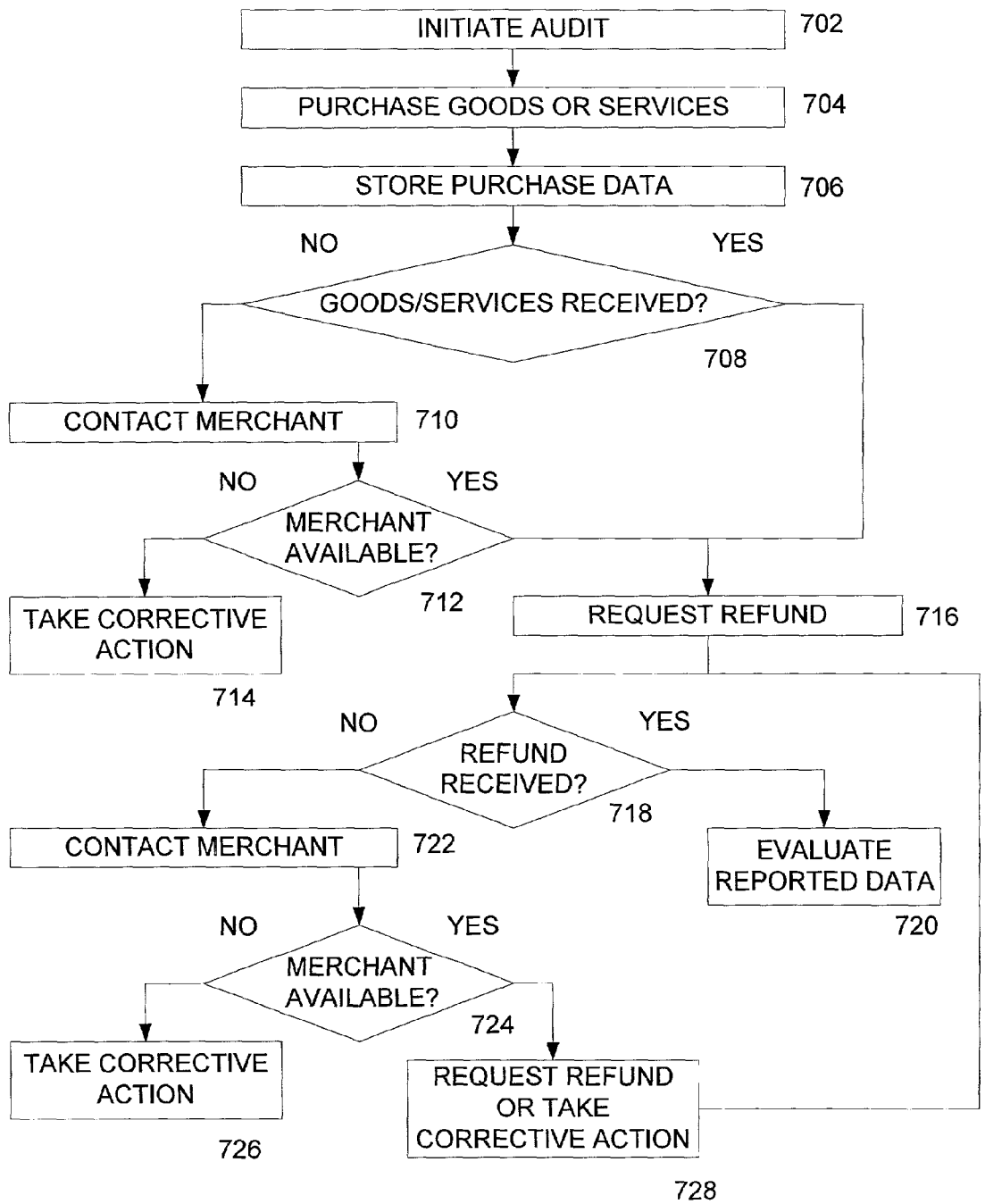
FIG. 7 is a flow chart of a method for performing an audit of a merchant in accordance with an exemplary embodiment of the present invention.

FIG. 7 is a flow chart of a method 700 for performing an audit of a merchant in accordance with an exemplary embodiment of the present invention. Method 700 allows merchants to be audited so as to determine whether changes in business stability may have occurred.

Method 700 begins at 702 where the audit is initiated. The audit can be initiated based upon a flag received from one or more monitoring systems, periodic audit data or flags, or other suitable audit initiation data. The method then proceeds to 704.

At 704 goods or services are purchased from a merchant. The goods or services can include goods or services that are suspect, goods or services that provide a good indication of whether or not the merchant is experiencing merchant stability, for other suitable goods and services. The goods and services can be ordered through a merchant website, by placing a phone order, from a catalog, or other suitable purchases. The method then proceeds to 706.

At 706 the purchase data is stored. The purchase data can include the date of purchase, the items purchased, the shipping method requested, the total amount charged for the purchase, and other suitable purchase data. The method then proceeds to 708.

At 708 it is determined whether the goods or services have been received. For example, it can be determined whether the goods or services have been received in the time requested, by the manner of shipping requested, in the number ordered, the color ordered, the quality ordered, the quantity ordered, or other suitable data. If it is determined at 708 that the goods and services have been properly received then the method proceeds to 716. Otherwise, the method proceeds to 710 where an attempt is made to contact the merchant. For example, the merchant can be contacted by telephone, by sending e-mail, by physically travelling to the merchant location, or by other suitable procedures. The method then proceeds to 712.

At 712 it is determined whether the merchant is available. If the merchant is not available, then the method proceeds to 714 where corrective action is taken, such as to determine whether the merchant has gone out of business or whether other situations have occurred. Otherwise, the method proceeds to 716 where a refund is requested. The refund may be requested by email, by interacting with the merchant's website, by postal service, by voice mail or a phone call, or by other suitable procedures. The method then proceeds to 718.

At 718 it is determined whether the refund has been received. For example, a flag can be generated after the refund is requested allowing a suitable length of time for a refund to be received, such as one week. Likewise, the length of time can be set based upon merchant indications of when the refund will be processed. If it is determined that a refund has not been received at 718, the method proceeds to 720 where the reported audit data is evaluated to determine whether any corrective actions need to be taken, such as adjusting credit limits or risk indicators.

If it is determined at 718 that a refund has not been received, the method proceeds to 722 where the merchant is contacted. The method then proceeds to 724 where it is determined whether the merchant is available. If the merchant is not available, the method proceeds to 726 where corrective actions are taken, such as stopping all credit processing, providing required legal notices, or other suitable actions. Otherwise, the method proceeds to 724 where the refund request is clarified, at which point the method returns to 718, or where a corrective action is taken if the merchant is unable to provide an adequate explanation of why a refund has not been provided.

In operation, method 700 provides an audit process that allows merchants to be audited to determine whether the merchant is experiencing business instability. Method 700 allows orders for goods or services to be placed and tracked, the length and time and quality of the goods and services to be monitored, refunds and chargeback data to be monitored, and other suitable data to be monitored to determine whether the merchant is undergoing any stability problems.

Although preferred and exemplary embodiments of a system and method for detecting changes in business stability have been described in detail herein, those skilled in the art will also recognize that various substitutions and modifications can be made to the systems and methods without departing from the scope and spirit of the appended claims.

What is claimed is:

1. A system for detecting changes in business stability comprising:
    a merchant system interface configured to receive payment data from a plurality of merchants, wherein each of the plurality of merchants has an associated merchant class;
    a credit processor coupled to the merchant system interface, the credit processor system configured to receive the payment data from the merchant system interface and storing the payment data;
    a merchant credit/risk system coupled to the credit processor, the merchant credit/risk system configured to generate business stability data from the payment data for each of the plurality of merchants as a function of the payment data for other merchants within the associated merchant class; and
    an underwriting system coupled to the merchant credit/risk system, the underwriting system configured to receive escrow data for each of the plurality of merchants and business stability data for each of the plurality of merchants and to generate an indication to increase an escrow amount for one or more of the plurality of merchants for an escrow account held by a merchant processor in response to the business stability data for the one or more of the plurality of merchants and as a function of the payment data for other merchants within the associated merchant class.

2. The system of claim 1 wherein the merchant credit/risk system further comprises a credit monitoring system configured to receive merchant credit rating data for each of the plurality of merchants and to provide the merchant credit rating data to the merchant credit/risk system, wherein the merchant credit/risk system is configured to use the merchant credit rating data to generate the business stability data for each of the plurality of merchants within an associated merchant class.

3. The system of claim 1 wherein the merchant credit/risk system further comprises a risk monitoring system configured to receive the payment data and range data for each of the plurality of merchants and to generate the business stability data from the payment data and the range data for each of the plurality of merchants within an associated merchant class.

4. The system of claim 1 wherein the merchant credit/risk system further comprises a chargeback system configured to receive the payment data for each of the plurality of merchants and to determine whether a change in chargeback data for two periods exceeds chargeback range data for each of the plurality of merchants within an associated merchant class.

5. The system of claim 1 wherein the merchant credit/risk system further comprises an average ticket system configured to receive the payment data for each of the plurality of merchants and to determine whether a change in average ticket data for two periods exceeds ticket range data for each of the plurality of merchants within an associated merchant class.

6. The system of claim 1 wherein the merchant credit/risk system further comprises a refund system configured to receive the payment data and to determine whether a change in refund data for two periods exceeds refund range data for each of the plurality of merchants within an associated merchant class.

7. The system of claim 1 wherein the merchant credit/risk system further comprises an audit system configured to receive the business stability data for each of the plurality of merchants and to generate audit flag data for one or more of the plurality of merchants.

8. The system of claim 1 wherein the merchant credit/risk system further comprises an account monitoring system configured to determine a projected liability of each of the plurality of merchants based upon the payment data for each of the plurality of merchants within an associated merchant class.

9. A system for detecting changes in business stability comprising:
    a merchant system interface configured to receive payment data from a plurality of merchants, wherein each of the plurality of merchants has an associated merchant class;
    a merchant credit/risk system configured to generate business stability data from the payment data for each of the plurality of merchants as a function of the payment data for other merchants within the associated merchant class; and
    an underwriting system coupled to the merchant credit/risk system, the underwriting system configured to receive escrow data for each of the plurality of merchants and business stability data for each of the plurality of merchants and to generate an indication to increase an escrow amount for one or more of the plurality of merchants for an escrow account held by a merchant processor in response to the business stability data for the one or more of the plurality of merchants and as a function of the payment data for other merchants within the associated merchant class.

10. The system of claim 9 wherein the merchant credit/risk system further comprises a credit monitoring system configured to receive merchant credit rating data for each of the plurality of merchants and to provide the merchant credit rating data to the merchant credit/risk system, wherein the merchant credit/risk system is configured to use the merchant credit rating data to generate the business stability data for each of the plurality of merchants within an associated merchant class.

11. The system of claim 9 wherein the merchant credit/risk system further comprises a risk monitoring system configured to receive the payment data and range data for each of the plurality of merchants and to generate the business stability data from the payment data and the range data for each of the plurality of merchants within an associated merchant class.

12. The system of claim 9 wherein the merchant credit/risk system further comprises a chargeback system configured to receive the payment data for each of the plurality of merchants and to determine whether a change in chargeback data for two periods exceeds chargeback range data for each of the plurality of merchants within an associated merchant class.

13. The system of claim 9 wherein the merchant credit/risk system further comprises an average ticket system configured to receive the payment data for each of the plurality of merchants and to determine whether a change in average ticket data for two periods exceeds ticket range data for each of the plurality of merchants within an associated merchant class.

14. The system of claim 9 wherein the merchant credit/risk system further comprises:
   a credit monitoring system configured to receive merchant credit rating data for each of the plurality of merchants and to provide the merchant credit rating data to the merchant credit/risk system, wherein the merchant credit/risk system is configured to use the merchant credit rating data to generate the business stability data for each of the plurality of merchants within an associated merchant class; and
   a risk monitoring system configured to receive the payment data and range data for each of the plurality of merchants and to generate the business stability data from the payment data and the range data for each of the plurality of merchants within an associated merchant class.

15. The system of claim 14 wherein the merchant credit/risk system further comprises a chargeback system configured to receive the payment data for each of the plurality of merchants and to determine whether a change in chargeback data for two periods exceeds chargeback range data for each of the plurality of merchants within an associated merchant class.

16. The system of claim 14 wherein the merchant credit/risk system further comprises an average ticket system configured to receive the payment data for each of the plurality of merchants and to determine whether a change in average ticket data for two periods exceeds ticket range data for each of the plurality of merchants within an associated merchant class.

17. The system of claim 9 wherein the merchant credit/risk system further comprises:
   a risk monitoring system configured to receive the payment data and range data for each of the plurality of merchants and to generate the business stability data from the payment data and the range data for each of the plurality of merchants within an associated merchant class; and
   chargeback system configured to receive the payment data for each of the plurality of merchants and to determine whether a change in chargeback data for two periods exceeds chargeback range data for each of the plurality of merchants within an associated merchant class.

18. The system of claim 17 wherein the merchant credit/risk system further comprises an average ticket system configured to receive the payment data for each of the plurality of merchants and to determine whether a change in average ticket data for two periods exceeds ticket range data for each of the plurality of merchants within an associated merchant class.

19. The system of claim 9 wherein the merchant credit/risk system further comprises:
   a chargeback system configured to receive the payment data for each of the plurality of merchants and to determine whether a change in chargeback data for two periods exceeds chargeback range data for each of the plurality of merchants within an associated merchant class; and an average ticket system configured to receive the payment data for each of the plurality of merchants and to determine whether a change in average ticket data for two periods exceeds ticket range data for each of the plurality of merchants within an associated merchant class.

20. A system for detecting changes in business stability comprising:
   a merchant system interface configured to receive payment data from a plurality of merchants, wherein each of the plurality of merchants has an associated merchant class:
   a merchant credit/risk system configured to generate business stability data from the payment data for each of the plurality of merchants as a function of the payment data for other merchants within the associated merchant class, the merchant credit/risk system further comprising:
      a credit monitoring system configured to receive merchant credit rating data for each of the plurality of merchants and to provide the merchant credit rating data to the merchant credit/risk system, wherein the merchant credit/risk system is configured to use the merchant credit rating data to generate the business stability data for each of the plurality of merchants within an associated merchant class;
      a risk monitoring system configured to receive the payment data and range data for each of the plurality of merchants and to generate the business stability data from the payment data and the range data for each of the plurality of merchants within an associated merchant class;
      a chargeback system configured to receive the payment data for each of the plurality of merchants and to determine whether a change in chargeback data for two periods exceeds chargeback range data for each of the plurality of merchants within an associated merchant class; and
      an average ticket system configured to receive the payment data for each of the plurality of merchants and to determine whether a change in average ticket data for two periods exceeds ticket range data for each of the plurality of merchants within an associated merchant class; and
   an underwriting system coupled to the merchant credit/risk system, the underwriting system configured to receive escrow data for each of the plurality of merchants and business stability data for each of the plurality of merchants and to generate an indication to increase an escrow amount for one or more of the plurality of merchants for an escrow account held by a merchant processor in response to the business stability data for the one or more of the plurality of merchants and as a function of the payment data for other merchants within the associated merchant class.

* * * * *

UNITED STATES PATENT AND TRADEMARK OFFICE
CERTIFICATE OF CORRECTION

PATENT NO.         : 8,429,067 B1
APPLICATION NO.    : 09/836953
DATED              : April 23, 2013
INVENTOR(S)        : Kathleen M. Keller et al.

It is certified that error appears in the above-identified patent and that said Letters Patent is hereby corrected as shown below:

In the Claims:

Column 13, line 61, insert --periodic-- after "the"
Column 16, line 32, replace ":" with ";"

Signed and Sealed this
Ninth Day of July, 2013

Teresa Stanek Rea
*Acting Director of the United States Patent and Trademark Office*